(12) United States Patent
Kotecha et al.

(10) Patent No.: US 10,484,441 B2
(45) Date of Patent: Nov. 19, 2019

(54) SWITCHING BETWEEN UNICAST STREAMS AND A MULTICAST STREAM BASED ON CONTENT DEMAND

(71) Applicant: Verizon Patent and Licensing Inc., Arlington, VA (US)

(72) Inventors: Lalit R. Kotecha, San Ramon, CA (US); Sagiv Draznin, Walnut Creek, CA (US); Matthew W. Nelson, Pleasanton, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 440 days.

(21) Appl. No.: 14/847,802

(22) Filed: Sep. 8, 2015

(65) Prior Publication Data
US 2017/0070549 A1    Mar. 9, 2017

(51) Int. Cl.
*H04L 29/06* (2006.01)
*H04W 4/06* (2009.01)

(52) U.S. Cl.
CPC ...... *H04L 65/4076* (2013.01); *H04L 65/4084* (2013.01); *H04L 65/60* (2013.01); *H04W 4/06* (2013.01)

(58) Field of Classification Search
USPC .......................................................... 370/312
See application file for complete search history.

(56) References Cited

U.S. PATENT DOCUMENTS

| | | | | |
|---|---|---|---|---|
| 6,704,576 B1 * | 3/2004 | Brachman | ............. | H04W 24/02 370/432 |
| 8,670,385 B2 * | 3/2014 | Bao | ........................ | H04W 28/24 370/328 |
| 8,819,264 B2 * | 8/2014 | Rodrigues | ........... | H04W 76/002 709/223 |
| 8,910,217 B2 * | 12/2014 | Tjio | ................... | H04N 21/2187 370/329 |
| 2007/0107026 A1 * | 5/2007 | Sherer | .................. | H04L 12/185 725/97 |
| 2007/0133484 A1 * | 6/2007 | Albal | .................. | H04W 72/005 370/338 |
| 2007/0168523 A1 * | 7/2007 | Jiang | ................. | H04L 29/06027 709/228 |
| 2008/0207137 A1 * | 8/2008 | Maharajh | .......... | G06F 17/30035 455/74 |
| 2009/0059832 A1 * | 3/2009 | Jhamnani | ............ | H04W 72/005 370/312 |

(Continued)

*Primary Examiner* — Alpus Hsu
*Assistant Examiner* — Hooman Houshmand

(57) ABSTRACT

A device may receive streaming information associated with one or more user devices, streaming content being provided to the one or more user devices, and a cell associated with the one or more user devices. The device may determine a quantity of user devices receiving the streaming content in the cell based on the streaming information. The device may determine whether the streaming content is being provided using a unicast stream or is being provided using a multicast stream. The device may determine to switch from the unicast stream to the multicast stream or from the multicast stream to the unicast stream based on the quantity of user devices. The device may switch from the unicast stream to the multicast stream, or the multicast stream to the unicast stream based on determining to switch.

20 Claims, 8 Drawing Sheets

(56) References Cited

U.S. PATENT DOCUMENTS

| | | | | |
|---|---|---|---|---|
| 2009/0081944 A1* | 3/2009 | Yavuz | ................ | H04L 12/1881 455/3.01 |
| 2009/0185522 A1* | 7/2009 | Periyalwar | ............ | H04W 48/18 370/328 |
| 2009/0198827 A1* | 8/2009 | Hughes | .............. | H04N 7/17318 709/231 |
| 2009/0316615 A1* | 12/2009 | Vedantham | ............ | H04W 36/02 370/312 |
| 2010/0106851 A1* | 4/2010 | Aoki | ...................... | H04L 45/00 709/231 |
| 2010/0118754 A1* | 5/2010 | Burton | ................. | H04L 12/185 370/312 |
| 2011/0032832 A1* | 2/2011 | Jalali | ................... | H04L 47/10 370/252 |
| 2011/0083153 A1* | 4/2011 | Cedervall | ........... | H04L 65/4076 725/88 |
| 2011/0228769 A1* | 9/2011 | Haimi-Cohen | ......... | H04L 12/18 370/390 |
| 2012/0155358 A1* | 6/2012 | Hao | ...................... | H04L 12/189 370/312 |
| 2012/0314641 A1* | 12/2012 | Kotecha | ................ | H04H 20/42 370/312 |
| 2013/0024582 A1* | 1/2013 | Rodrigues | ........... | H04W 76/002 709/231 |
| 2013/0044614 A1* | 2/2013 | Aguirre | ................ | H04W 28/24 370/252 |
| 2013/0287139 A1* | 10/2013 | Zhu | ................... | H04N 21/2365 375/295 |
| 2013/0294321 A1* | 11/2013 | Wang | ..................... | H04W 4/06 370/312 |
| 2014/0177504 A1* | 6/2014 | Sayeed | ............... | H04W 72/005 370/312 |
| 2014/0286159 A1* | 9/2014 | Etemad | ................ | H04W 36/14 370/230 |
| 2016/0277465 A1* | 9/2016 | Hou | ..................... | H04N 21/2387 |
| 2016/0359755 A1* | 12/2016 | Li | ........................... | H04W 4/06 |
| 2017/0332209 A1* | 11/2017 | Awai | ..................... | G06F 13/00 |

* cited by examiner

US 10,484,441 B2

SWITCHING BETWEEN UNICAST STREAMS AND A MULTICAST STREAM BASED ON CONTENT DEMAND

BACKGROUND

Wireless networks allocate base station resources for different services, such as voice services, unicast services, broadcast services, and multicast services. Evolved multimedia broadcast multicast service ("eMBMS") provides efficient delivery by allowing streaming content to be sent once and received by many end users using a multicast stream. Unicast services transmit content multiple times, using a unicast stream for each unique destination address.

DETAILED DESCRIPTION OF PREFERRED EMBODIMENTS

Figure 1A:
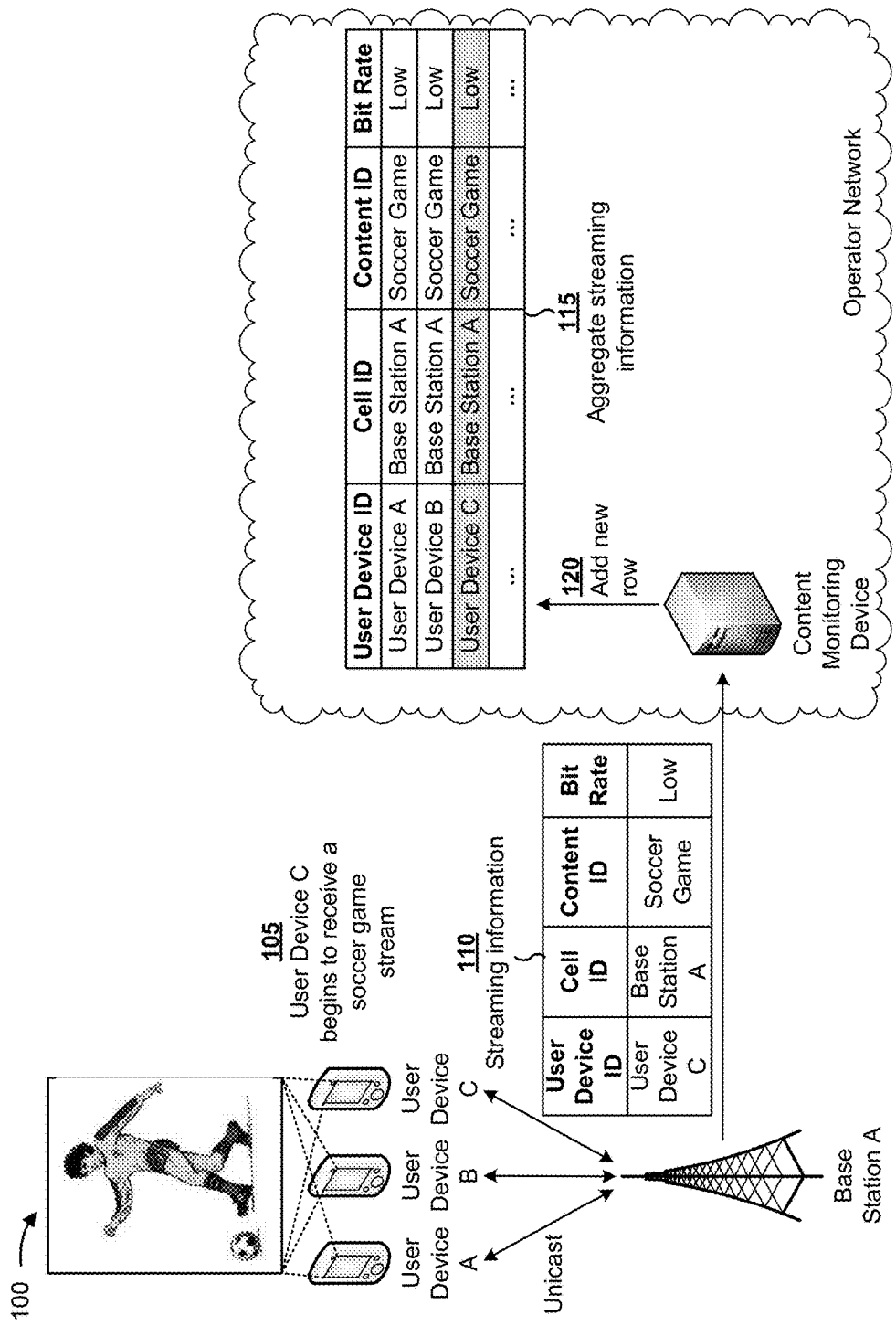
FIGS. 1A-1C are diagrams of an overview of an example implementation described herein.

The following detailed description of example implementations refers to the accompanying drawings. The same reference numbers in different drawings may identify the same or similar elements.

Evolved multimedia broadcast multicast service ("eMBMS") provides efficient delivery by allowing streaming content (e.g., such as a video file, audio file, or the like) to be sent once and received by many end users using a multicast stream. Wireless networks may use eMBMS to multicast the streaming content (e.g., when the streaming content is sent to multiple user devices, associated with a cell, using one stream) or to broadcast the streaming content (e.g., when the streaming content is sent to all user devices associated with the cell, using one stream). The use of eMBMS is different than providing the streaming content using a unicast service, which provides the streaming content to each user device receiving the streaming content in a separate unicast stream. The cell may be associated with a base station, such as an eNodeB, or the like. A user device may be associated with the cell when the cell is providing the user device access to the wireless network.

Normally, to provide an eMBMS, a network service provider may have to manually select the streaming content and provision the wireless network to provide the streaming content using the eMBMS. For example, if the network service provider chose not to provide the streaming content using the eMBMS and chose instead to use the unicast service, then the wireless network may continue to provide the streaming content using the unicast service regardless of a quantity of user devices, associated with the cell, that are receiving the streaming content, and regardless of a quantity of unicast streams being used by the cell. Similarly, if the network service provider chose to provide the streaming content using the eMBMS, then the wireless network would continue to provide the streaming content using the eMBMS service regardless of the quantity of user devices, associated with the cell, that are receiving the streaming content. Furthermore, the network service provider may have no knowledge of the quantity of user devices associated with the cell that are receiving the streaming content and, therefore, may not be able to know whether the streaming content should be sent via a multicast stream or one or more unicast streams.

Implementations described herein allow the wireless network to determine whether to provide the streaming content via a multicast stream or one or more unicast streams based on a demand for the streaming content (e.g., the quantity of user devices, associated with the cell, that are receiving the streaming content). By basing a type of service (e.g., eMBMS or unicast service) on the quantity of user devices, associated with the cell, that are receiving the streaming content, the wireless network can more efficiently allocate resources, thereby saving processor resources, memory resources, and network resources. For example, when a threshold quantity of user devices are receiving the streaming content, the wireless network may switch from multiple unicast streams to a multicast stream to save bandwidth, processor resources, and memory resources associated with sending multiple copies of the streaming content to multiple user devices. As another example, when there are fewer than a threshold quantity of user devices receiving the streaming content, the wireless network may switch to one or more unicast streams from a multicast stream, which may take more resources to set up and maintain than one or a few unicast streams. As a result, implementations described herein save processor and memory resources.

Figure 1B:
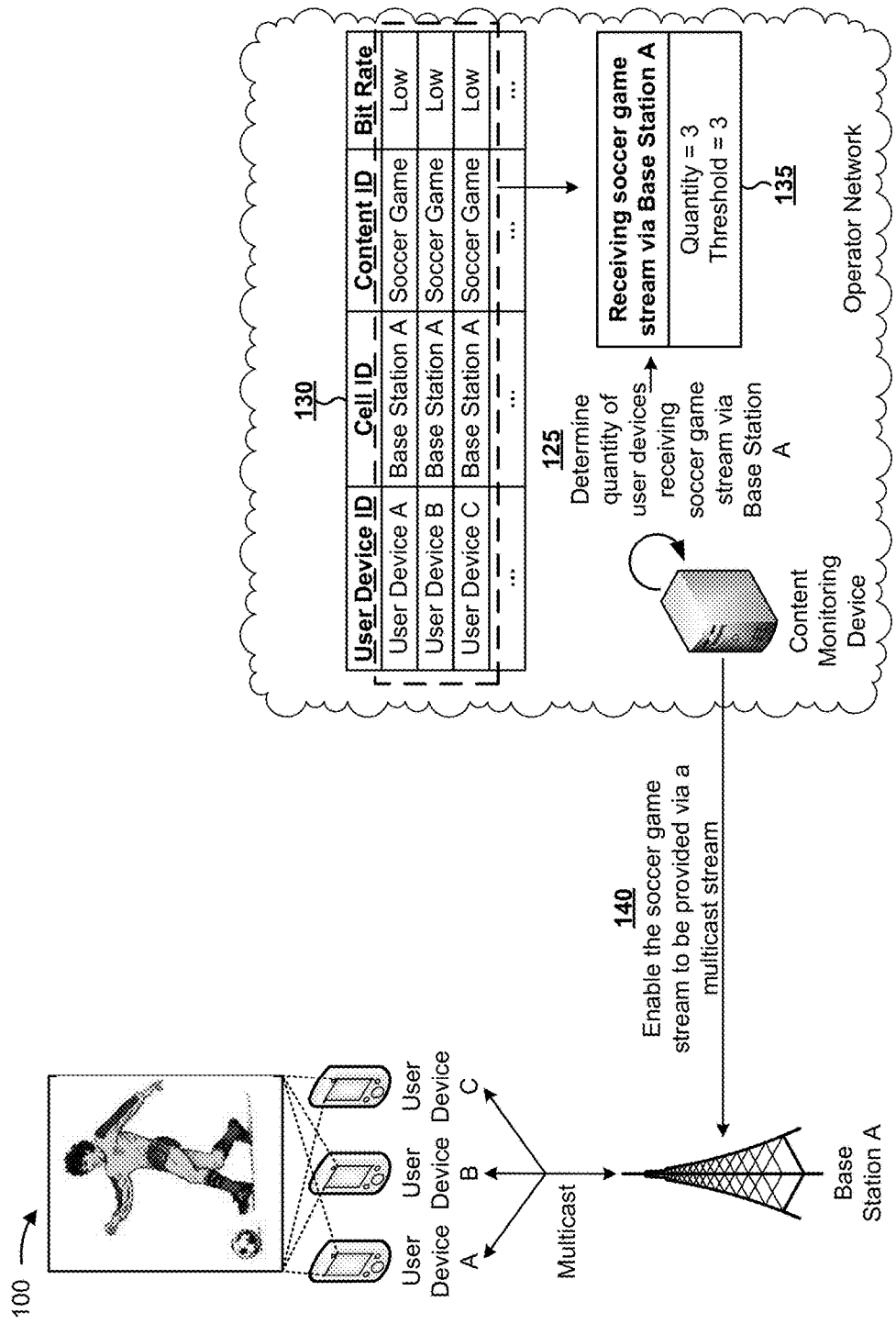
Figure 1C:
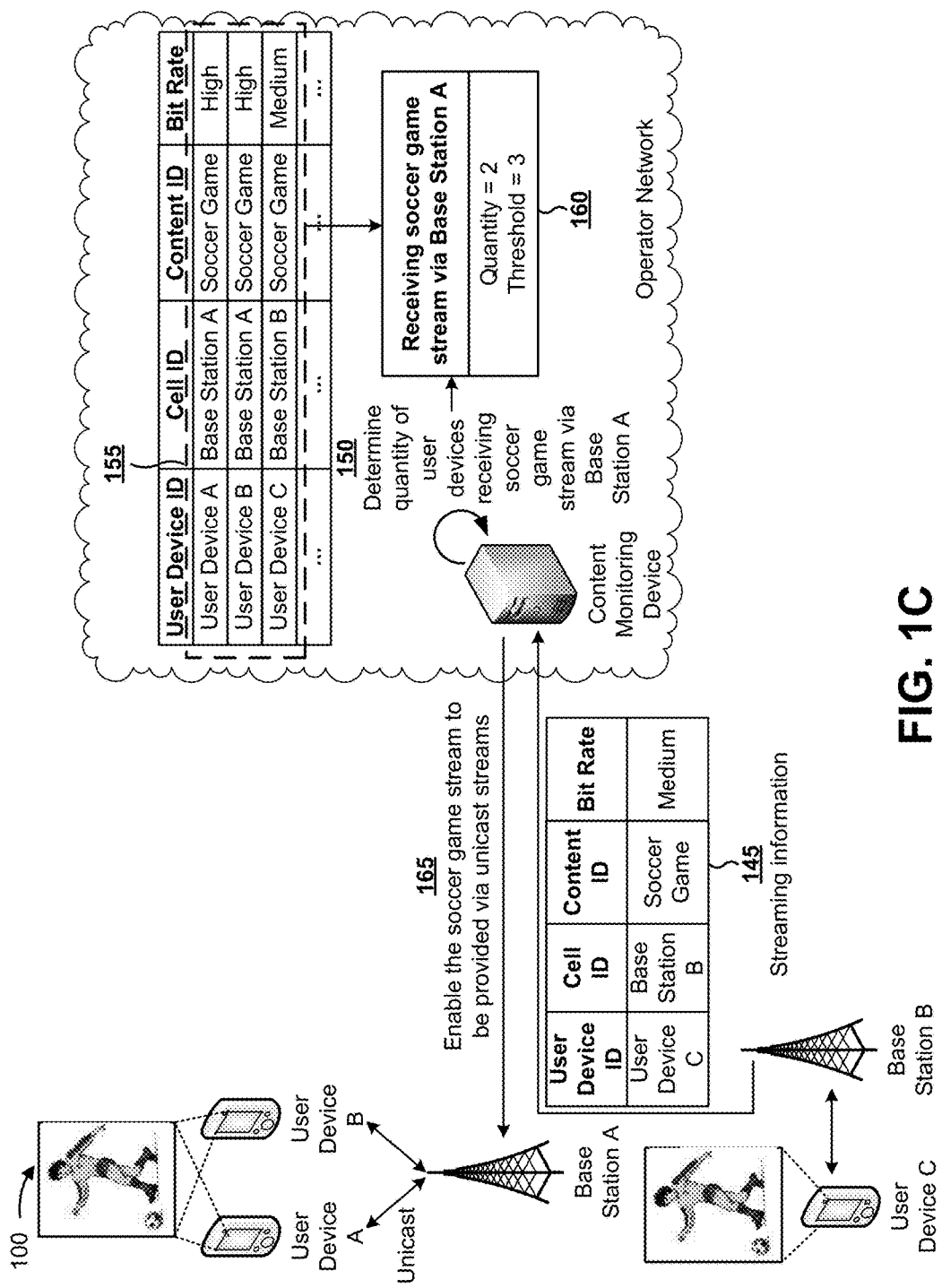

FIGS. 1A-1C are diagrams of an overview of an example implementation 100 described herein. As shown in FIG. 1A, and by reference number 105, assume that User Device C begins to receive a unicast stream of a soccer game that User Device A and User Device B are already receiving. User Device A, User Device B, and User Device C are all receiving a soccer game stream via three separate and individualized unicast streams from Base Station A. As shown by reference number 110, Base Station A sends streaming information to a content monitoring device based on User Device C starting to receive the soccer game stream (e.g., a particular streaming content). As shown, the streaming information includes information that identifies streaming content (labeled as "Content ID"), information that identifies a base station sending the streaming content to a user device (labeled as "Cell ID"), information that identifies the user device receiving the streaming content (labeled as "User Device ID"), and/or information that identifies a bit rate of the streaming content (labeled as "Bit Rate"). As shown, the User Device ID is "User Device C," the Cell ID is "Base Station A," the Content ID is "Soccer Game," and the Bit Rate is "Low" (e.g., below a threshold).

As shown by reference number 115, the content monitoring device aggregates and stores the streaming information using a data structure, which associates the User Device ID with the Cell ID and the Content ID. As shown by reference number 120, the content monitoring device adds a new row to the data structure for User Device C, which identifies that User Device C is receiving the soccer game stream, from Base Station A, at a low bit rate.

As shown in FIG. 1B, and by reference number 125, the content monitoring device may determine the quantity of user devices receiving the soccer game stream via Base Station A. As shown by reference number 130, the content monitoring device identifies the quantity of user devices receiving the soccer game stream via Base Station A by identifying the user devices that have "Base Station A" as a Cell ID and "Soccer Game" as a Content ID. As shown, the content monitoring device identifies User Device A, User Device B, and User Device C as the user devices that are receiving the soccer game stream via Base Station A. As shown by reference number 135, the content monitoring device determines that three user devices are receiving the soccer game stream via Base Station A, and compares this quantity to a threshold for providing streaming content via a multicast stream. As shown, the threshold is also three.

As shown by reference number 140, if the quantity of user devices is greater than or equal to the threshold, which is the case in example implementation 100, then the content monitoring device enables Base Station A to provide the soccer game stream via a multicast stream. The content monitoring device also provides an instruction, via Base Station A, to User Device A, User Device B, and User Device C, to configure the user devices to receive content via the multicast stream. As shown, User Device A, User Device B, and User Device C all begin to receive the soccer game stream from Base Station A via a multicast stream. Additionally, or alternatively, the content monitoring device may determine to provide the soccer game stream via a multicast stream based on a bit rate at which the soccer game stream is being delivered to a user device, as described in more detail below.

As shown in FIG. 1C, and by reference number 145, assume that User Device C is no longer receiving the soccer game stream from Base Station A and is instead receiving the soccer game stream from Base Station B (e.g., as may occur if User Device C changes location, receives stronger signals from Base Station B, or the like). As shown by reference number 145, Base Station B sends streaming information to the content monitoring device based on User Device C receiving the soccer game stream via Base Station B. As shown, the User Device ID is "User Device C," the Cell ID is "Base Station B," the Content ID is "Soccer Game," and the bit rate is "Medium" (e.g., above a first threshold and below a second threshold). The content monitoring device updates the information in the data structure by changing the Cell ID associated with User Device C to "Base Station B," and the Bit Rate to "Medium."

As shown by reference number 150, the content monitoring device may determine the quantity of user devices receiving the soccer game stream via Base Station A, as described above in connection with FIG. 1B. As shown by reference number 155, the content monitoring device determines that User Device A and User Device B are receiving the soccer game stream via Base Station A. As shown by reference number 160, there are now two user devices receiving the soccer game stream via Base Station A, and the threshold for providing the streaming content (e.g., the soccer game) via a multicast stream is three.

As shown by reference number 165, since the quantity of user devices does not satisfy the threshold, the content monitoring device enables Base Station A to provide the soccer game stream via separate unicast streams. The content monitoring device also provides an instruction, via Base Station A, to User Device A and User Device B to receive the soccer game stream via a unicast stream. As shown, Base Station A provides the content to User Device A using a first unicast stream and to User Device B using a second unicast stream. The content monitoring device may provide a similar analysis to determine whether Base Station B is to provide the soccer game stream via a unicast stream or a multicast stream.

Implementations described herein allow a device in a wireless network (e.g., a content monitoring device) to determine whether to provide streaming content via a multicast stream or one or more unicast streams based on a demand for the streaming content. The demand may be determined based on a quantity of user devices, associated with a cell, that are receiving the streaming content, based on a bit rate at which user devices in the cell are receiving the streaming content, or the like. By basing a type of service (e.g., a multicast service, a unicast service, or a broadcast service) and the type of stream (e.g., a multicast stream, a broadcast stream, or a unicast stream) on the quantity of user devices (or the bit rate associated with the user devices), associated with the cell, that are receiving the streaming content, the wireless network is more flexible and can more efficiently allocate resources, thereby saving bandwidth, processor resources, and memory resources.

Figure 2:
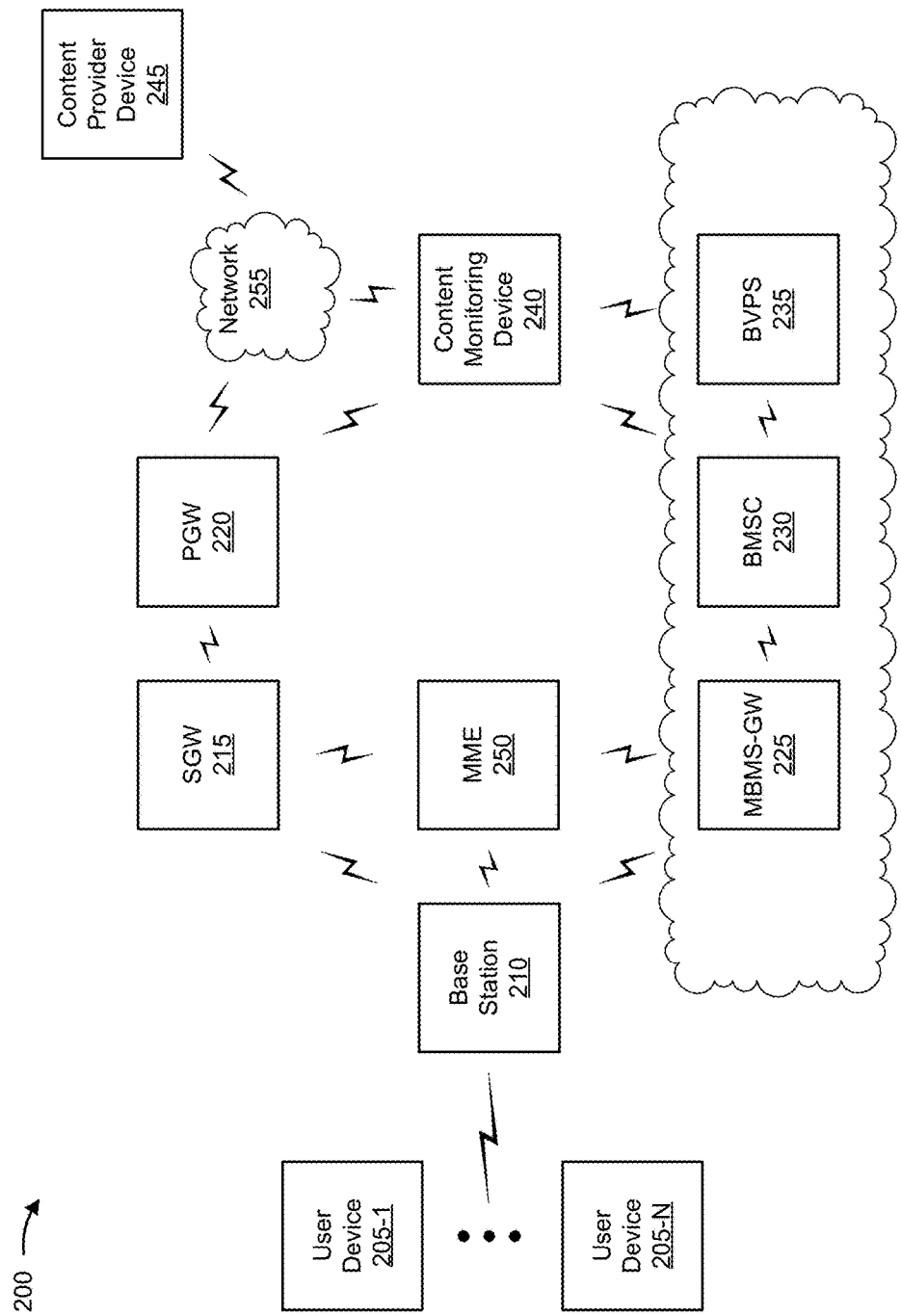
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include one or more user devices 205-1 through 205-N (N≥1) (hereinafter referred to collectively as "user devices 205," and individually as "user device 205"), a base station 210, a serving gateway (SGW) 215, a packet data-network gateway (PGW) 220, a Multimedia Broadcast/Multicast Service Gateway (MBMS-GW) 225, a Broadcast-Multicast Service Center device (BMSC) 230, a broadcast video provisioning system (BVPS) 235, a content monitoring device 240, a content provider device 245, a mobility management entity device (MME) 250, and/or a network 255. Devices of environment 200 may interconnect via wired connections, wireless connections, or a combination of wired and wireless connections.

User device 205 may include one or more devices capable of communicating with base station 210 and/or a network (e.g., network 255). For example, user device 205 may include a wireless communication device, a radiotelephone, a personal communications system (PCS) terminal (e.g., that may combine a cellular radiotelephone with data processing and data communications capabilities), a smart phone, a laptop computer, a tablet computer, a personal gaming system, and/or a similar device. User device 205 may send traffic to and/or receive traffic from network 255 (e.g., via base station 210, SGW 215, and/or PGW 220).

Base station 210 may include one or more devices capable of transferring traffic, such as audio, video, text, and/or other traffic, destined for and/or received from user device 205. In some implementations, base station 210 may include an Evolved Node B (eNodeB or eNB) associated with a Long-Term Evolution (LTE) network that receives traffic from and/or sends traffic to network 255 via SGW 215 and/or PGW 220. Additionally, or alternatively, one or more base stations 210 may be associated with a radio access network (RAN) that is not associated with the LTE network. Base station 210 may send traffic to and/or receive traffic from user device 205 via an air interface. In some implementations, base station 210 may include a small cell base station, such as a base station of a microcell, a picocell, and/or a femtocell.

SGW 215 may include one or more devices capable of routing packets. For example, SGW 215 may include a traffic transfer device, such as a gateway, a router, a modem, a switch, a firewall, a network interface card (NIC), a hub, a bridge, a server device, an optical add/drop multiplexer (OADM), or any other type of device that processes and/or transfers traffic. In some implementations, SGW 215 may aggregate traffic received from one or more base stations 210 associated with the LTE network, and may send the aggregated traffic to network 255 (e.g., via PGW 220) and/or other network devices associated with an evolved packet core (EPC) and/or an IP Multimedia Subsystem (IMS) core. SGW 215 may also receive traffic from network 255 and/or other network devices, and may send the traffic to user device 205 via base station 210. Additionally, or alternatively, SGW 215 may perform operations associated with handing off user device 205 to and/or from an LTE network.

PGW 220 may include one or more devices capable of providing connectivity for user device 205 to external packet data networks. For example, PGW 220 may include one or more data processing and/or traffic transfer devices, such as a gateway, a router, a modem, a switch, a firewall, a NIC, a hub, a bridge, a server device, an OADM, or any other type of device that processes and/or transfers traffic. In some implementations, PGW 220 may aggregate traffic received from one or more SGWs 215, and may send the aggregated traffic to network 255. Additionally, or alternatively, PGW 220 may receive traffic from network 255, and may send the traffic to user device 205 via SGW 215 and base station 210. PGW 220 may record data usage information (e.g., byte usage).

MBMS-GW 225 may include one or more devices capable of routing packets related to a multicast stream or a broadcast stream. For example, MBMS-GW 225 may include a traffic transfer device, such as a gateway, a router, a modem, a switch, a firewall, a NIC, a hub, a bridge, a server device, an OADM, or any other type of device that processes and/or transfers traffic. MBMS-GW 225 may receive traffic from network 255 and/or other network devices, and may send the received traffic (e.g., streaming content) to user device 205 via base station 210.

BMSC 230 may include one or more devices capable of receiving, generating, storing, processing, and/or providing information associated with providing a broadcast or multicast service. For example, BMSC 230 may include a server device, a traffic transfer device (e.g., a router, a switch, a hub, etc.), or a similar device. In some implementations, BMSC 230 may allocate bandwidth for providing a broadcast or a multicast service, and/or may instruct other devices associated with providing the broadcast or multicast service.

BVPS 235 may include one or more devices capable of receiving, generating, storing, processing, and/or providing information associated with providing a broadcast or multicast service. For example, BVPS 235 may include a server device, a traffic transfer device (e.g., a router, a switch, a hub, etc.), or a similar device. In some implementations, BVPS 235 may provision an eMBMS by communication with BMSC 230 and content monitoring device 240. BVPS 235 may create broadcast and/or multicast services.

Content monitoring device 240 may include one or more devices capable of receiving, generating, storing, processing, and/or providing streaming information associated with streaming content being received by user devices 205. For example, content monitoring device 240 may include a computing device, such as a server (e.g., a web server, a database server, etc.), a network device (e.g., a traffic transfer device, a gateway, a router, a switch, a firewall, a hub, etc.), or a similar device. In some implementations, content monitoring device 240 may receive streaming content from content provider device 245 and may provide the streaming content to PGW 220, BMSC 230, and/or BVPS 235. In some implementations, content monitoring device 240 may provide instructions, relating to providing streaming content from content provider device 245, to PGW 220, BMSC 230, and/or BVPS 235 (without actually receiving the streaming content from content provider device 245).

Content provider device 245 may include one or more devices capable of receiving, generating, storing, processing, and/or providing streaming content. For example, content provider device 245 may include a computing device, such as a server (e.g., a web server, a proxy server, etc.), a network device, or a similar device.

MME 250 may include one or more devices, such as one or more server devices, capable of managing authentication, activation, deactivation, and/or mobility functions associated with user device 205. In some implementations, MME 250 may perform operations relating to authentication of user device 205. Additionally, or alternatively, MME 250 may facilitate the selection of a particular SGW 215 and/or a particular PGW 220 to serve traffic to and/or from user device 205. MME 250 may perform operations associated with handing off user device 205 from a first base station 210 to a second base station 210 when user device 205 is transitioning from a first cell associated with the first base station 210 to a second cell associated with the second base station 210. Additionally, or alternatively, MME 250 may select another MME (not pictured), to which user device 205 should be handed off (e.g., when user device 205 moves out of range of MME 250).

Network 255 may include one or more wired and/or wireless networks. For example, network 255 may include a cellular network (e.g., an LTE network, a 3G network, a code division multiple access (CDMA) network, etc.), a public land user network (PLMN), a wireless local area network (e.g., a Wi-Fi network), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
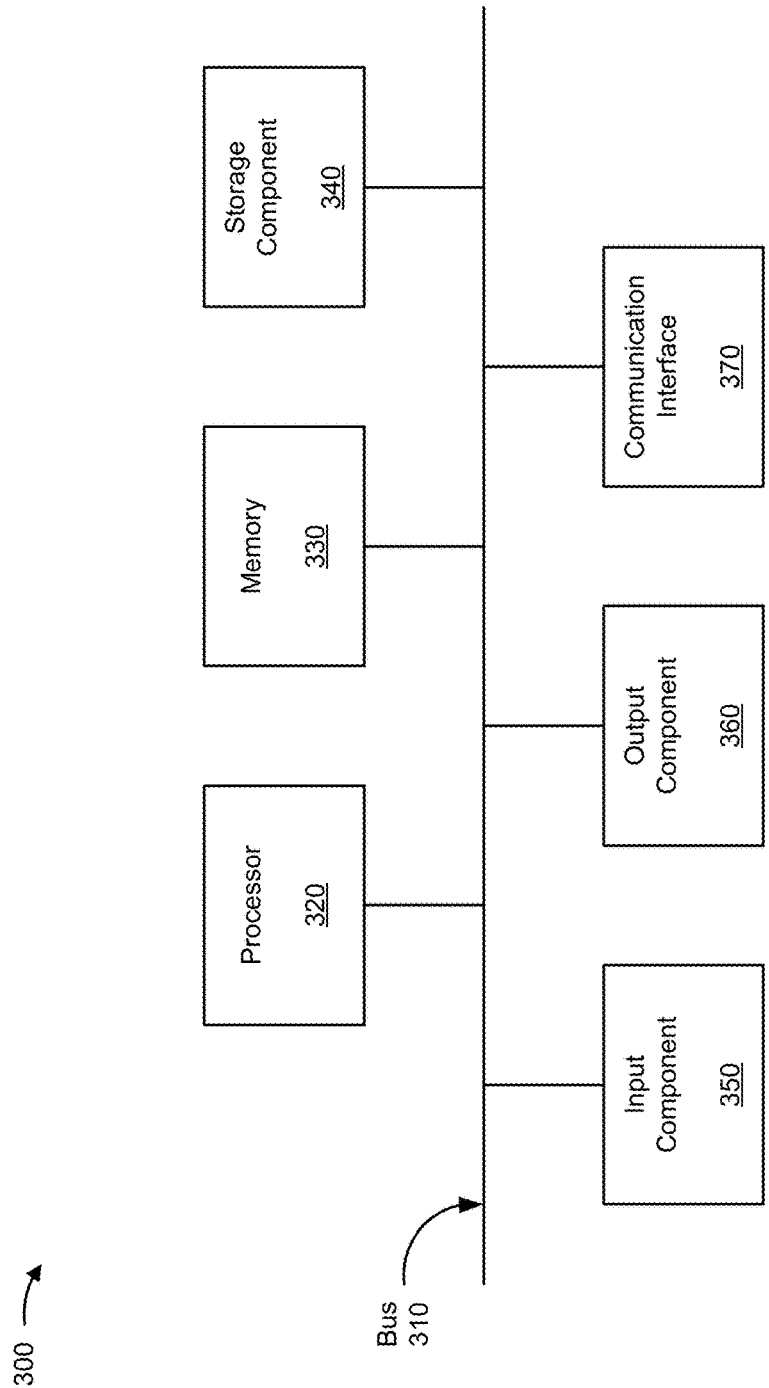
FIG. 3 is a diagram of example components of one or more devices of FIG. 2.

FIG. 3 is a diagram of example components of a device 300. Device 300 may correspond to user device 205, base station 210, SGW 215, PGW 220, MBMS-GW 225, BMSC 230, BVPS 235, content monitoring device 240, content provider device 245, and/or MME 250. In some implementations, user device 205, base station 210, SGW 215, PGW 220, MBMS-GW 225, BMSC 230, BVPS 235, content monitoring device 240, content provider device 245, and/or MME 250 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 may include a component that permits communication among the components of device 300. Processor 320 is implemented in hardware, firmware, or a combination of hardware and software. Processor 320 may include a processor (e.g., a central processing unit (CPU), a graphics processing unit (GPU), an accelerated processing unit (APU), etc.), a microprocessor, and/or any processing component (e.g., a field-programmable gate array (FPGA), an application-specific integrated circuit (ASIC), etc.) that interprets and/or executes instructions. In some implementations, processor 320 may include one or more processors capable of being programmed to perform a function. Memory 330 may include a random access memory (RAM), a read only memory (ROM), and/or another type of dynamic or static storage device (e.g., a flash memory, a magnetic memory, an optical memory, etc.) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 350 may include a component that permits device 300 to receive information, such as via user input (e.g., a touch screen display, a keyboard, a keypad, a mouse, a button, a switch, a microphone, etc.). Additionally, or alternatively, input component 350 may include a sensor for sensing information (e.g., a global positioning system (GPS) component, an accelerometer, a gyroscope, an actuator, etc.). Output component 360 may include a component that provides output information from device 300 (e.g., a display, a speaker, one or more light-emitting diodes (LEDs), etc.).

Communication interface 370 may include a transceiver-like component (e.g., a transceiver, a separate receiver and transmitter, etc.) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
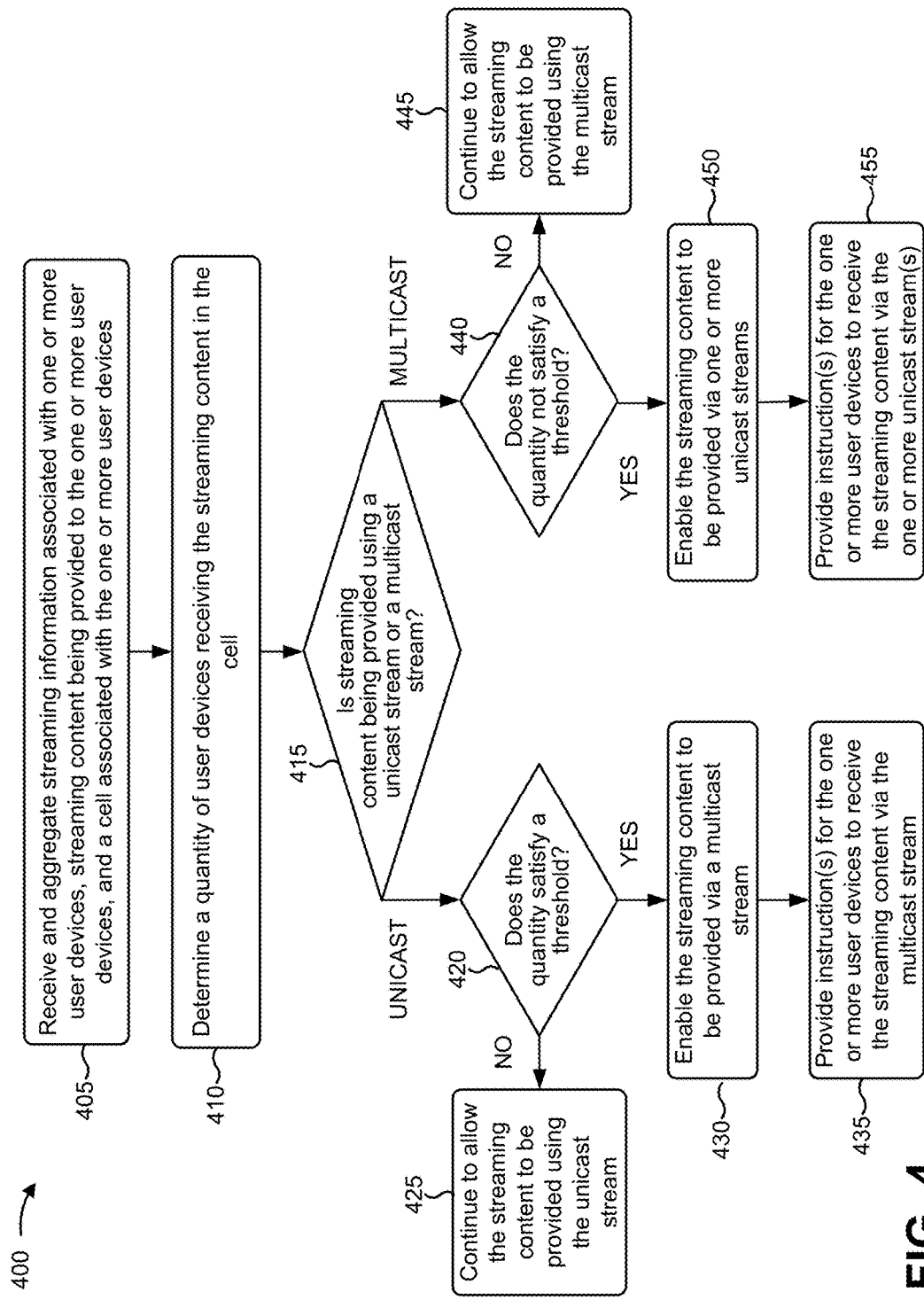
FIG. 4 is a flow chart of an example process for switching between one or more unicast streams and a multicast stream based on content demand.

FIG. 4 is a flow chart of an example process 400 for switching between one or more unicast streams and a multicast stream based on content demand. In some implementations, one or more process blocks of FIG. 4 may be performed by content monitoring device 240. In some implementations, one or more process blocks of FIG. 4 may be performed by another device or a group of devices separate from or including content monitoring device 240, such as user device 205, base station 210, SGW 215, PGW 220, MBMS-GW 225, BMSC 230, BVPS 235, content provider device 245, and/or MME 250.

As shown in FIG. 4, process 400 may include receiving and aggregating streaming information associated with one or more user devices, streaming content being provided to the one or more user devices, and a cell associated with the one or more user devices (block 405). For example, content monitoring device 240 may receive and aggregate streaming information associated with one or more user devices 205. In some implementations, content monitoring device 240 may receive the streaming information from the one or more user devices 205 via base station 210, SGW 215, PGW 220, MBMS-GW 225, and/or BMSC 230.

In some implementations, content monitoring device 240 may receive the streaming information based on a triggering event (e.g., when user device 205 begins to receive the streaming content, when user device 205 stops, pauses, or aborts reception of and/or playback of the streaming content, when the user device 205 switches from a first base station 210 to a second base station 210, or the like). In some implementations, content monitoring device 240 may receive streaming information at regular intervals (e.g., by monitoring traffic at regular intervals, requesting the streaming content at regular intervals, or receiving the streaming information from another device at regular intervals).

In some implementations, the streaming information may include a content identifier. The content identifier may identify streaming content (e.g., a video stream, an audio stream, or the like). For example, the content identifier may include a name of the streaming content, a uniform resource identifier (URI) that identifies a location of the streaming content, a unique string of characters associated with the streaming content and inserted by content monitoring device 240 prior to user device 205 receiving the streaming content, or the like.

Additionally, or alternatively, the streaming information may include a cell identifier. The cell identifier may identify a particular cell (e.g., an area covered by a particular base station 210) associated with the particular base station 210 that provides the streaming content to user devices 205 associated with the cell. The cell identifier may be a name of the particular base station 210, a number associated with the particular base station 210, a character string associated with the particular base station 210, or the like.

Additionally, or alternatively, the streaming information may include one or more user device identifiers corresponding to the one or more user devices 205 receiving the streaming content and associated with the cell. A user device identifier may identify a particular user device 205. For example, a user device identifier may include an international mobile subscriber identify (IMSI), a mobile directory number (MDN), an international mobile station equipment identity (IMEI), or the like.

Additionally, or alternatively, the streaming information may include one or more bit rates corresponding to the one or more user devices 205. A bit rate may include information that identifies the amount of data, of the streaming content, sent over a period of time from base station 210 to user device 205. For example, the bit rate may be 250 kilobits per second (kbps).

Additionally, or alternatively, the streaming information may include a segment identifier associated with the streaming content. The segment identifier may include information that identifies a segment of the streaming content that is being received. The segment may include a file that is included in the streaming content, a time period of the streaming content, or the like. For example, the segment identifier may identify that the streaming content is thirty minutes from the beginning of the streaming content.

In some implementations, user device 205 and/or base station 210 may provide the content identifier, the cell identifier, the user device identifier, and/or the bit rate of the streaming content in the streaming information. In some implementations, content monitoring device 240 may send a request for the cell identifier based on the user device identifier (e.g., content monitoring device 240 may send the request to PGW 220). In some implementations, user device 205 may determine the content identifier from a URI associated with the streaming content or from information that content monitoring device 240 inserted into the streaming content or the URI associated with the streaming content when the streaming content was requested by user device 205.

In some implementations, content monitoring device 240 may aggregate the streaming information by updating old streaming information with new streaming information. Content monitoring device 240 may store the old streaming information in a data structure and update the data structure with the new streaming information. Content monitoring device 240 may associate and store the user device identifier with the content identifier and the cell identifier in the data structure. In some implementations, content monitoring device 240 may also store the segment identifier, associated with streaming content, with the user device identifier in the data structure. Additionally, or alternatively, content monitoring device 240 may store a user device identifier so the user device identifier is associated with a stream mode (e.g., a multicast stream mode or a unicast stream mode) in the data structure. Content monitoring device 240 may update the old streaming information stored in the data structure based on the new streaming information by adding and/or changing information in the data structure as needed.

As further shown in FIG. 4, process 400 may include determining a quantity of user devices receiving the streaming content in the cell (block 410). For example, content monitoring device 240 may determine the quantity of user devices 205 receiving the streaming content in the cell based on receiving and aggregating the streaming information. For example, when the streaming information is aggregated, content monitoring device 240 may identify user devices 205 that are receiving the streaming content and that are associated with the cell by using the content identifier for the streaming content and the cell identifier of the cell. Once content monitoring device 240 determines which user devices 205 are receiving the streaming content and associated with the cell, content monitoring device 240 may determine the quantity of user devices 205 that are receiving the streaming content and that are associated with the cell. In some implementations, where the streaming content is not a live feed, content monitoring device 240 may group user devices 205 that are associated with the cell and receiving the streaming content into separate groups based on the segment identifier, and may determine the quantity of user devices 205 for each separate group.

As further shown in FIG. 4, process 400 may include determining whether the streaming content is being provided using a unicast stream or a multicast stream (block 415). For example, content monitoring device 240 may determine whether the streaming content is being provided using a unicast stream or a multicast stream based on the streaming information. The streaming content may be provided via the unicast stream when the one or more user devices 205 are receiving the streaming content via one or more corresponding unicast streams. The streaming content may be provided via the multicast stream when the one or more user devices 205 are all receiving the streaming content via a single multicast stream.

In some implementations, content monitoring device 240 may control a stream mode by which user devices 205 receive the streaming content, as described below. Content monitoring device 240 may store the stream mode in a data structure by associating the stream mode with the content identifier and the cell identifier, when content monitoring device 240 changes the stream mode of user devices 205 associated with the streaming content or when a new stream (e.g. a unicast stream or a multicast stream) is being sent.

As further shown in FIG. 4, if the streaming content is being provided using a unicast stream (block 415—UNICAST), then process 400 may include determining whether the quantity of user devices satisfies a threshold (block 420). For example, when the streaming content is currently being provided using the unicast stream mode, content monitoring device 240 may determine whether the quantity of user devices 205, described in connection with block 410, is greater than or equal to a threshold for providing the streaming content using the multicast stream mode. In some implementations, the quantity may be the quantity of user devices, associated with the cell, receiving the streaming content at a particular segment identified by the segment identifier.

The threshold may be a quantity that is set and/or stored by content monitoring device 240. The threshold may be set based on a quantity of user devices 205 in which providing the streaming content using the unicast stream mode is no longer more efficient than providing the streaming content using the multicast stream mode. For example, the threshold may be three, four, five, or some other quantity.

Additionally, or alternatively, content monitoring device 240 may identify whether the one or more user devices 205, receiving the streaming content in the cell, are receiving the streaming content at a bit rate that satisfies a bit rate threshold (e.g., is less than the bit rate threshold). The bit rate threshold may be set based on a bit rate in which providing the streaming content using the unicast stream mode is no longer more efficient than providing the streaming content using the multicast stream mode.

As further shown in FIG. 4, if the quantity of user devices does not satisfy the threshold (block 420—NO), then process 400 may include continuing to allow the streaming content to be provided using the unicast stream (block 425). For example, content monitoring device 240 may continue to allow the streaming content to be provided, to the one or more user devices 205, using the unicast stream mode, when the quantity of user devices 205 does not meet or exceed the threshold. Additionally, or alternatively, content monitoring device 240 may continue to allow the streaming content to be provided, to the one or more user devices 205, using the unicast stream mode, when the bit rate of the one or more user devices 205 does not satisfy the threshold (e.g., is greater than or equal to the threshold). Since PGW 220 may already be providing the streaming content using the unicast mode, content monitoring device 240 may not need to take any further action to allow the streaming content to be provided using the unicast stream mode.

As further shown in FIG. 4, if the quantity of user devices satisfies the threshold (block 420—YES), then process 400 may include enabling the streaming content to be provided via a multicast stream (block 430). For example, content monitoring device 240 may enable the streaming content to be provided via a multicast stream, when the quantity is greater than or equal to the threshold for providing the streaming content using the multicast mode. Additionally, or alternatively, content monitoring device 240 may enable the streaming content to be provided via a multicast stream when the bit rate, of the one or more user devices 205, satisfies a threshold (e.g., is less than the threshold).

In some implementations, content monitoring device 240 may instruct BVPS 235 to create a multicast network (e.g., a multicast-broadcast single frequency network (MBSFN) or the like) to provide the streaming content to multiple devices. In some implementations, base station 210, which is associated with the cell, may be included among the multiple devices being provided the streaming content in the multicast network, since the quantity of user devices 205 receiving the streaming content satisfies the threshold. In some implementations, when content monitoring device 240 determines that the threshold is satisfied for other cell(s), content monitoring device 240 may include other base station(s) 210, associated with the other cell(s), among the multiple devices being provided the streaming content in the multicast network.

Additionally, or alternatively, content monitoring device 240 may send a request, to BVPS 235, to establish a multicast service (e.g., evolved multimedia broadcast multicast service (eMBMS)), associated with the multicast network, for providing the multicast stream. The multicast service may use one or more communication channels to transmit the multicast stream, which may include the streaming content and control signal information (e.g., in relation to transmitting the streaming content and providing the multicast stream). BVPS 235 may establish the multicast service using base station 210 and the other(s) base station(s) 210 associated with the multicast network.

Additionally, or alternatively, BVPS 235 may send, to content monitoring device 240, an acknowledgement, based on the request from content monitoring device 240, when the multicast service is established. The acknowledgement may include a service identifier. The service identifier may be used to identify the multicast service and/or multicast stream associated with the multicast service. The service identifier may allow a device, such as user device 205, to access the multicast service.

Once the multicast service is established using base station 210, base station 210 may provide the streaming content via the multicast stream. In some implementations, when the one or more user devices 205 includes all of the user devices 205 in the cell, base station 210 may provide the streaming content via a broadcast stream. By switching to the multicast stream when the quantity is greater than or equal to the threshold, content monitoring device 240 will save bandwidth, processor resources, and memory resources associated with providing multiple unicast streams.

As further shown in FIG. 4, process 400 may include providing instruction(s) for the one or more user devices to receive the streaming content via the multicast stream (block 435). For example, content monitoring device 240 may provide instruction(s) for the one or more user devices 205 to receive the streaming content via the multicast stream. In some implementations, the instruction may include a service identifier associated with the multicast stream. In some implementations, the service identifier may identify the channel(s) associated with the multicast stream. In some implementations, the channel(s) associated with the multicast stream may be identified in the instruction and the service identifier may serve as a key to receiving the multicast stream via the channel(s). Additionally, or alternatively, the instruction may include configuration information that user device 205 may use to receive the multicast stream. Once the one or more user devices 205 receive the instruction(s), the one or more user devices 205 may receive the multicast stream or the broadcast stream (e.g., when the one or more user devices 205 are all the user devices 205 in the cell) if the streaming content is being provided using the multicast stream mode.

As further shown in FIG. 4, if the streaming content is being provided using a multicast stream (block 415—MULTICAST), then process 400 may include determining whether the quantity of user devices does not satisfy a threshold (block 440). For example, when the streaming content is currently being provided using the multicast stream mode, content monitoring device 240 may determine whether the quantity of user devices 205, as described in connection with block 410, is less than the threshold for providing the streaming content using the unicast mode. In some implementations the quantity may be the quantity of user devices, associated with the cell, receiving the streaming content at a same segment identified by the segment identifier.

The threshold may be a quantity that is set and stored in content monitoring device 240. The threshold may be set based on a quantity of user devices 205 in which providing the streaming content using the multicast stream mode is no longer more efficient than providing the streaming content using the unicast stream mode. For example, the threshold may be three, four, five, or the like. In some implementations, this threshold is the same threshold used to determine whether the quantity of user devices is greater than or equal to the threshold for streaming the content using the multicast mode.

As further shown in FIG. 4, if the quantity of user devices satisfies the threshold (block 440—NO), then process 400 may include continuing to allow the streaming content to be provided using the multicast stream (block 445). For example, content monitoring device 240 may continue to allow the streaming content to be provided, to the one or more user devices 205, using the multicast stream mode, when the quantity of user devices 205 does not meet or exceed the threshold. Since BMSC 230 may already be providing the streaming content using the multicast stream mode, content monitoring device 240 may not need to take any further action.

As further shown in FIG. 4, if the quantity of user devices does not satisfy the threshold (block 440—YES), then process 400 may include enabling the streaming content to be provided via one or more unicast streams (block 450). For example, when the quantity is less than the threshold for providing the streaming content using the multicast stream mode, content monitoring device 240 may enable the streaming content to be provided via one or more unicast streams. In some implementations, content monitoring device 240 may ensure a separate unicast stream is provided for each of the one or more user devices 205 in the cell (e.g., the one or more unicast streams correspond to the one or more user devices 205 in the cell).

Content monitoring device 240 may instruct PGW 220 to send a unicast stream to user devices 205 via PGW 220. Additionally, or alternatively, content monitoring device 240 may stop base station 210 from transmitting the multicast stream by sending, to base station 210, an instruction to end the multicast stream. In some implementations, if no other base station 210 is associated with the multicast stream, content monitoring device 240 may instruct BVPS 235 to disestablish the multicast service. By switching to the one or more unicast streams when the quantity is less than or equal to the threshold, content monitoring device 240 will save processor and memory resources associated with overhead needed for providing the multicast stream.

As further shown in FIG. 4, process 400 may include providing instruction(s) for the one or more user devices to receive the streaming content via the one or more unicast streams (block 455). For example, content monitoring device 240 may provide instruction(s) for the one or more user devices 205 to receive the streaming content via one or more unicast streams. In some implementations, an instruction may include configuration information that user device 205 may use to receive a unicast stream. Once the one or more user devices 205 receive the instruction, the one or more user devices 205 may receive the one or more unicast streams that correspond to the one or more user devices 205.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

By basing a type of service (e.g., a multicast service or a unicast service) and the type of stream (e.g., the multicast stream or the one or more unicast streams) on the quantity of user devices 205 receiving the streaming content and/or the bit rate associated with the streaming content, the wireless network is more flexible and can more efficiently allocate resources, thereby saving bandwidth, processor resources, and memory resources.

Figure 5A:
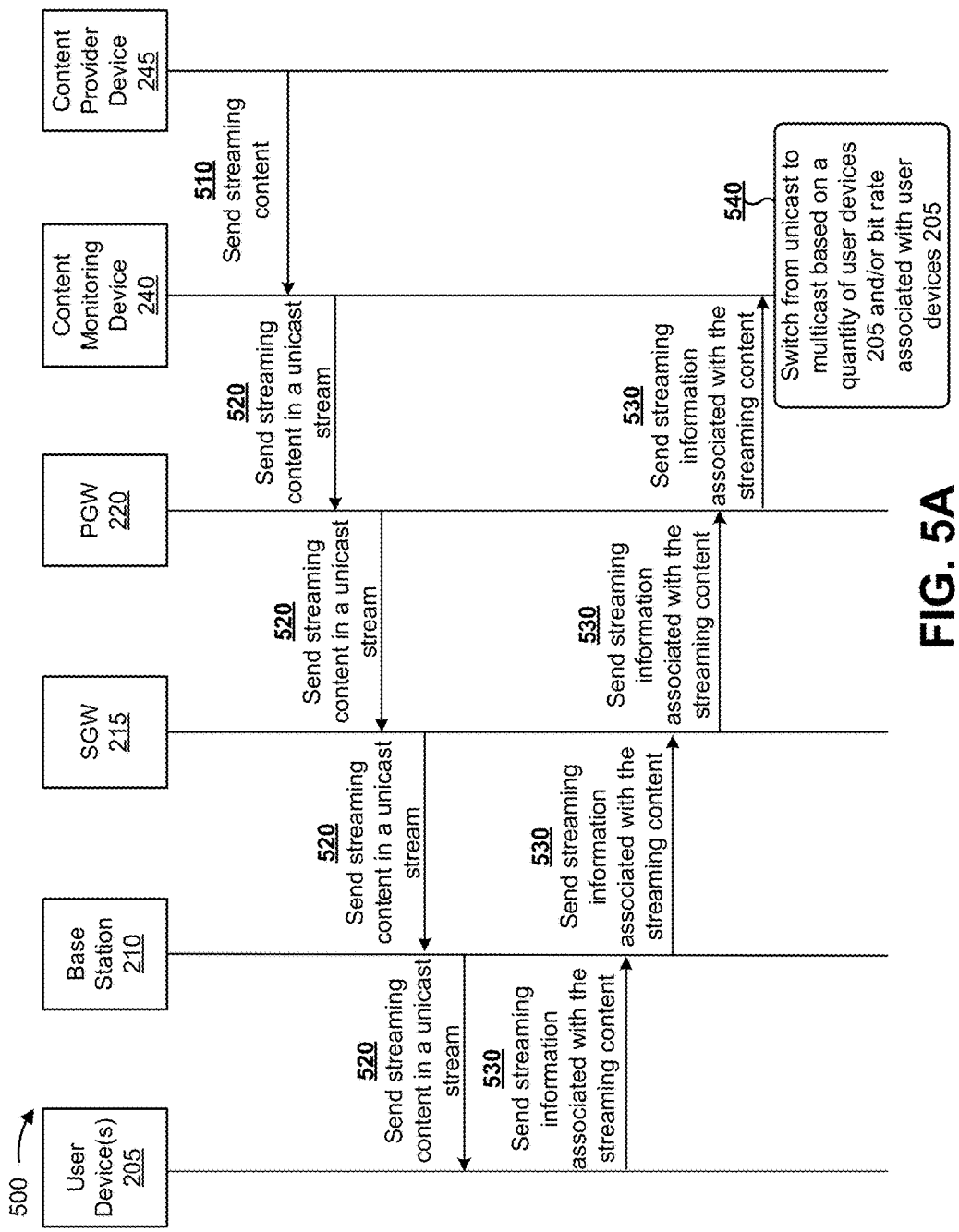
FIGS. 5A and 5B are signal diagrams of an example implementation relating to the example process shown in FIG. 4.
Figure 5B:
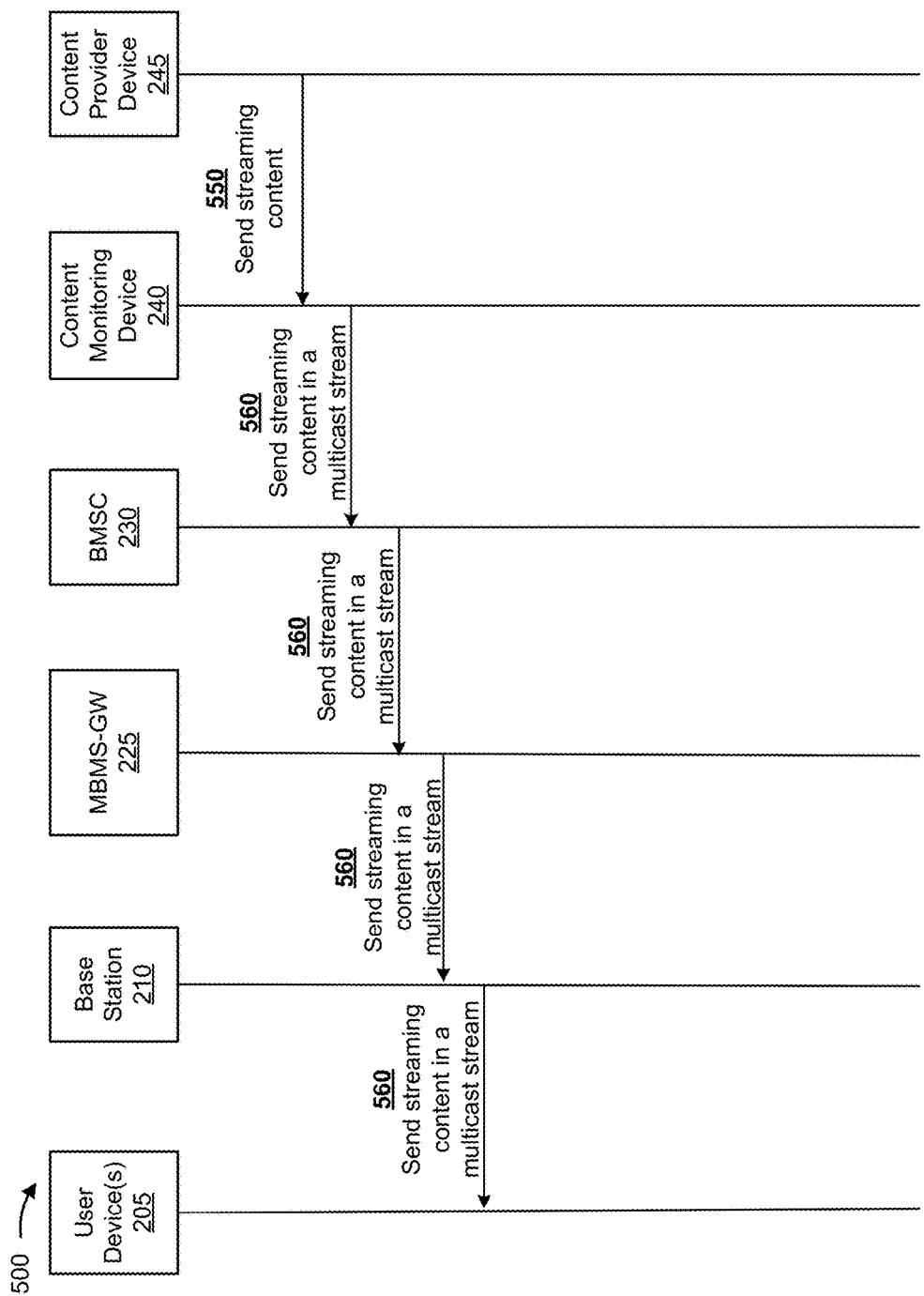

FIGS. 5A and 5B are signal diagrams of an example implementation 500 relating to example process 400 shown in FIG. 4. FIGS. 5A and 5B show an example of switching between one or more unicast streams and a multicast stream based on content demand.

As shown in FIG. 5A, and by reference number 510, content provider device 245 sends the streaming content to content monitoring device 240. As shown by reference number 520, content monitoring device 240 provides the streaming content via a unicast stream to one or more user devices 205 via PGW 220, SGW 215, and base station 210. As shown by reference number 530, based on receiving the streaming content, user device 205 sends streaming information, associated with the streaming content, to content monitoring device 240 via base station 210, SGW 215, and PGW 220. The streaming information identifies user device 205, the streaming content, a cell associated with user device 205, and one or more bit rates corresponding to the user device 205. This process may be performed for multiple user devices 205 such that content monitoring device 240 aggregates streaming information associated with multiple user devices 205. As shown by reference number 540, content monitoring device 240 determines to switch from a unicast stream to a multicast stream based on a quantity of user devices 205 that are receiving the streaming content in the cell, and/or the one or more bit rates corresponding to the one or more user devices 205.

As shown in FIG. 5B, and by reference number 550, content provider device 245 sends the streaming content to content monitoring device 240. As shown by reference number 560, content monitoring device 240 provides the streaming content to the one or more user devices 205, using a multicast stream, via BMSC 230, MBMS-GW 225, and base station 210. Content monitoring device 240 provides the streaming content using a multicast stream based on determining to switch from unicast to multicast.

As indicated above, FIGS. 5A and 5B are provided merely as an example. Other examples are possible and may differ from what was described with regard to FIGS. 5A and 5B.

Implementations described herein allow a device in the wireless network (e.g., a content monitoring device) to determine whether to provide streaming content via a multicast stream or one or more unicast streams based on a quantity of user devices, associated with a cell, that are receiving the streaming content, and/or based on bit rates at which one or more user devices are receiving the streaming content. By basing a type of service (e.g., a multicast service or a unicast service) and the type of stream (e.g., the multicast stream or the one or more unicast streams) on the quantity of user devices receiving the streaming content and/or the bit rate, the wireless network is more flexible and can more efficiently allocate resources, thereby saving bandwidth, processor resources, and memory resources.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, or the like.

To the extent the aforementioned embodiments collect, store, or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
a memory; and
one or more processors, communicatively coupled to the memory, to:
 receive streaming information associated with a plurality of user devices,
  streaming content being provided to the plurality of user devices, a first cell, and a second cell,
  the streaming information including a segment identifier that identifies a segment of the streaming content and a cell identifier that identifies a first base station associated with the first cell or a second base station associated with the second cell,
  the streaming information being:
   a live feed, or
   not a live feed, and
  the segment identifier being used to group the plurality of user devices into one or more separate groups when the streaming information is not a live feed;
 determine that a user device, of the plurality of user devices, switched from receiving the streaming content from the second base station to receiving the streaming content from the first base station;
 determine, based on the user device switching to receive the streaming content from the second base station, a quantity of user devices, of the plurality of user devices, associated with the first cell;
 determine, for the first base station, a bit rate at which one or more respective user devices, of the plurality of user devices, receive the streaming content;
 compare the bit rate and a bit rate threshold at the first base station;
 determine that the streaming content is being provided using a unicast stream for the first base station;
 determine to switch from the unicast stream to a multicast stream for the first base station based on the quantity of user devices exceeding a quantity threshold and based on comparing the bit rate and the bit rate threshold;
 switch from the unicast stream to the multicast stream for the first base station based on determining to switch; and
 receive an acknowledgement when a multicast service is established,
  the acknowledgement including a service identifier,
   the service identifier to allow the user devices to access the multicast stream associated with the multicast service.

2. The device of claim 1, where the one or more processors, when determining to switch from the unicast stream to the multicast stream, are to:
 determine that the quantity of user devices satisfies a threshold for switching from the unicast stream to the multicast stream.

3. The device of claim 1, where the one or more processors, are further to:
 determine that the quantity of user devices no longer satisfies the quantity threshold; and
 determining to switch from the multicast stream to the unicast stream based on the quantity of user device not satisfying the quantity threshold.

4. The device of claim 3, where the one or more processors, are further to:
 enable the streaming content to be provided via one or more unicast streams; and
 provide an instruction for the one or more respective user devices to receive the streaming content via the one or more unicast streams.

5. The device of claim 1, where the one or more processors, when switching from the unicast stream to the multicast stream, are to:
 enable the streaming content to be provided via the multicast stream; and
 provide an instruction for the one or more respective user devices to receive the streaming content via the multicast stream.

6. The device of claim 5, where the one or more processors, when providing the instruction for the one or more respective user devices to receive the streaming content via the multicast stream, are to:
 provide the service identifier, included with the instruction, that allows the one or more respective user devices to identify and receive the multicast stream.

7. The device of claim 1, where the one or more processors, when receiving the streaming information, are to:
 identify the streaming content and the one or more respective user devices based on the streaming information;
 send a request, to another device, to identify the first cell or the second cell associated with the one or more respective user devices; and
 receive, from the other device, information that identifies the first cell or the second cell based on sending the request.

8. A non-transitory computer-readable medium storing instructions, the instructions comprising:
 one or more instructions that, when executed by one or more processors, cause the one or more processors to:

receive streaming information associated with a plurality of user devices, streaming content being provided to the plurality of user devices, a first cell, and a second cell,
the streaming information including a segment identifier that identifies a segment of the streaming content and a cell identifier that identifies a first base station associated with the first cell or a second base station associated with the second cell,
the streaming information being:
a live feed, or
not a live feed, and
the segment identifier being used to group the plurality of user devices into one or more separate groups when the streaming information is not a live feed;
determine that a user device, of the plurality of user devices, switched from receiving the streaming content from the first base station to receiving the streaming content from the second base station;
determine, based on the user device switching to receive the streaming content from the second base station, a quantity of user devices, of the plurality of user devices, associated with the first cell and a quantity of user devices, of the plurality of user devices, associated with the second cell based on the segment identifier;
determine that the streaming content is being provided using a multicast stream from the first base station;
determine a bit rate at which one or more user devices, of the plurality of user devices, associated with the second base station receive the streaming content;
determine that the streaming content is being provided using a unicast stream from the second base station;
compare the bit rate and a bit rate threshold for switching from the unicast stream to a multicast stream;
compare the quantity of user devices, associated with the second cell, and a quantity threshold for switching from the unicast stream to the multicast stream;
determine that the bit rate threshold is satisfied based on comparing the bit rate and the bit rate threshold;
determine that the quantity threshold is satisfied based on comparing the quantity of user devices, associated with the second base station, and the quantity threshold;
switch, based on determining that the quantity threshold is satisfied and that the bit rate threshold is satisfied, from the unicast stream to the multicast stream; and
receive an acknowledgement when a multicast service is established,
the acknowledgement including a service identifier, the service identifier to allow the user devices to access the multicast stream associated with the multicast service.

9. The non-transitory computer-readable medium of claim 8, where the one or more instructions, that cause the one or more processors to determine that the quantity threshold is satisfied, cause the one or more processors to:
determine that the quantity threshold is satisfied based on the quantity of user devices meeting or exceeding the quantity threshold.

10. The non-transitory computer-readable medium of claim 8, where the one or more instructions, that cause the one or more processors to switch from the unicast stream to the multicast stream, cause the one or more processors to:
enable the streaming content to be provided via the multicast stream; and
provide an instruction for the one or more user devices to receive the streaming content via the multicast stream.

11. The non-transitory computer-readable medium of claim 10, where the one or more instructions, that cause the one or more processors to provide the instruction for the plurality of user devices, cause the one or more processors to:
provide the service identifier, included with the instruction, that allows the one or more user devices to identify and receive the multicast stream.

12. The non-transitory computer-readable medium of claim 8, where the one or more instructions, that cause the one or more processors to receive the streaming information, cause the one or more processors to:
provide a content identifier for the streaming content;
receive the streaming information, which includes the content identifier; and
use the content identifier to identify the streaming content.

13. The non-transitory computer-readable medium of claim 8, where the bit rate threshold is a first bit rate threshold, and
where the one or more instructions, further cause the one or more processors to:
determine that the bit rate is above the first bit rate threshold and below a second bit rate threshold.

14. The non-transitory computer-readable medium of claim 8, where the one or more instructions further cause the one or more processors to:
store the segment identifier with a user device identifier, of the user device, in a data structure.

15. A method, comprising:
receiving, by a device, streaming information that identifies a plurality of user devices, streaming content being provided to the plurality of user devices, a first cell, and a second cell,
the streaming information including a segment identifier that identifies a segment of the streaming content and a cell identifier that identifies the first cell associated with a first base station or the second cell associated with a second base station,
the streaming information being:
a live feed, or
not a live feed, and to
the segment identifier being used to group the plurality of user devices into one or more separate groups when the streaming information is not a live feed;
determining, by the device, that a user device, of the plurality of user devices, switched from receiving the streaming content from the first base station to receiving the streaming content from the second base station;
determining, by the device and based on the user device switching to receive the streaming content from the second base station, a quantity of user devices, of the plurality of user devices, associated with the first cell and a quantity of user devices, of the plurality of user devices, associated with the second cell;
determining, by the device, a bit rate at which one or more user devices, of the plurality of user devices, associated with the second base station receive the streaming content;
determining, by the device, that the streaming content is being provided using a multicast stream from the first base station based on the streaming information;

determining, by the device, that the streaming content is being provided using a unicast stream from the second base station based on the streaming information;

comparing, by the device and for the second base station, the bit rate and a bit rate threshold for switching from the unicast stream to a multicast stream;

comparing, by the device, the quantity of user devices, associated with the second cell, and a quantity threshold for switching from the unicast stream to the multicast stream;

determining, by the device, that the bit rate threshold is satisfied based on comparing the bit rate and the bit rate threshold;

determining, by the device, that the quantity threshold is satisfied based on comparing the quantity of user devices, associated with the second cell, and the quantity threshold;

switching, by the device, from the unicast stream to the multicast stream based on determining that the quantity threshold is satisfied and that the bit rate threshold is satisfied; and receiving, by the device, an acknowledgement when a multicast service is established,
the acknowledgement including a service identifier, the service identifier to allow the user devices to access the multicast stream associated with the multicast service.

16. The method of claim 15, where determining that the quantity threshold is satisfied comprises:
determining that the quantity threshold is satisfied based on the quantity of user devices being greater than or equal to the quantity threshold.

17. The method of claim 15, further comprising:
determining that the quantity threshold is no longer satisfied;
enabling, based on determining that the quantity threshold is no longer satisfied, the streaming content to be provided via one or more unicast streams; and
providing an instruction for the one or more user devices to receive the streaming content via the one or more unicast streams.

18. The method of claim 15, further comprising:
sending a request, to another device, to identify the first cell or the second cell associated with the plurality of user devices; and
receiving, from the other device, information that identifies the first cell or the second cell.

19. The method of claim 15, where the plurality of user devices are all of the user devices in the second cell; and
where the multicast stream is a broadcast stream.

20. The method of claim 15, further comprising:
storing the segment identifier with a user device identifier, of a user device of the plurality of user devices, in a data structure.

* * * * *